United States Patent [19]

Sakai et al.

[11] Patent Number: 4,664,963

[45] Date of Patent: May 12, 1987

[54] MAGNETIC RECORDING MEDIUM AND PRODUCTION PROCESSES THEREOF

[75] Inventors: Yusaku Sakai; Yoshito Kitamoto, both of Yokohama; Shinji Ohtaki; Yasushi Tamaki, both of Kawasaki; Hikaru Nagai, Yokohama, all of Japan

[73] Assignee: Fujitsu Limited, Kanagawa, Japan

[21] Appl. No.: 623,259

[22] Filed: Jun. 21, 1984

[30] Foreign Application Priority Data

Jun. 22, 1983 [JP] Japan ................................ 58-113517

[51] Int. Cl.$^4$ .............................................. G11B 5/72
[52] U.S. Cl. ...................................... 428/142; 427/128; 427/131; 428/172; 428/179; 428/694; 428/695; 428/900
[58] Field of Search ............... 428/695, 142, 172, 179, 428/694, 900; 427/131, 128; 360/134–136

[56] References Cited

U.S. PATENT DOCUMENTS

| | | | |
|---|---|---|---|
| 4,069,360 | 1/1978 | Yanagisawa | 427/131 |
| 4,152,487 | 5/1979 | Yanagisawa | 428/694 |
| 4,154,875 | 5/1979 | Yanagisawa | 427/131 |
| 4,307,156 | 12/1981 | Yanagisawa | 428/694 |
| 4,326,229 | 4/1982 | Yanagisawa | 428/694 |
| 4,425,404 | 1/1984 | Suzuki | 428/694 |
| 4,540,618 | 9/1985 | Suzuki | 428/694 |

*Primary Examiner*—Ellis P. Robinson
*Attorney, Agent, or Firm*—Armstrong, Nikaido, Marmelstein & Kubovcik

[57] ABSTRACT

A magnetic recording medium having an excellent resistance to wear and CSS strength and showing a satisfactory lubricant retention, and processes for production thereof. The magnetic recording medium includes a substrate having formed thereon, in sequence, a magnetic recording layer, a protective coating, and a lubricant coating, the protective coating including a plane portion and a plurality of fine projections and recesses formed on the plane portion.

10 Claims, 48 Drawing Figures

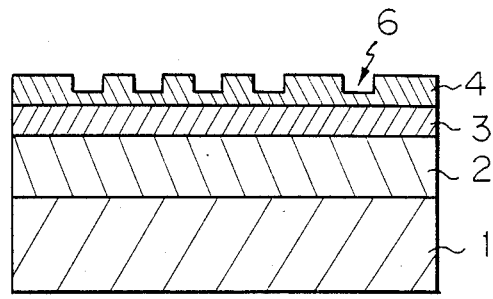
Fig. 4A
PRIOR ART
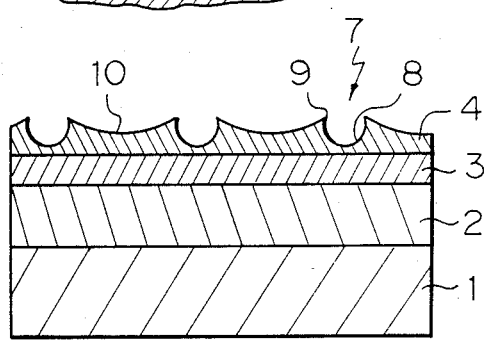
Fig. 4B
PRIOR ART
Fig. 5A
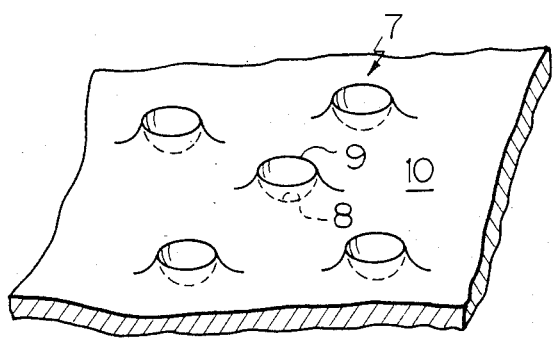
Fig. 5B 6.66 μm 2 μm

MAGNETIC RECORDING MEDIUM AND PRODUCTION PROCESSES THEREOF

BACKGROUND OF THE INVENTION

1. Field of the Invention

This invention relates to a magnetic recording medium, more particularly, to a magnetic disc which includes a substrate having coated on at least one surface thereof, in sequence, a magnetic recording layer, a protective coating, and a lubricant coating. The magnetic recording medium of this invention is particularly useful in magnetic recording devices such as a magnetic disc device based on a contact-start-stop (CSS) system. This invention also relates to a process for the production of the magnetic recording medium.

2. Description of the Prior Art

Heretofore, various types of the magnetic recording media have been developed for use in magnetic disc devices for data handling and other applications. They generally include a disc-like substrate of aluminum, similar light metals, or their alloys at least one surface of the substrate having a magnetic recording layer.

A typical example of the prior art magnetic recording media can be found in FIG. 1, in which reference number 1 is an aluminum substrate. In the illustrated recording medium, the substrate 1 has an alumite or anodized aluminum coating 2 effective for enhancing the physical and chemical properties of the underlying aluminum substrate and adhesion of a magnetic recording layer 3 to the substrate. There are two types of magnetic recording layers: One is a discontinuous magnetic layer, having dispersed therein binding agents or binders such as synthetic resins, which can be produced by coating a mixture of magnetic powders and binders on the substrate by means of a spin coater. The other is a continuous magnetic layer containing no binder. The continuous magnetic layer can be produced, for example, by depositing magnetic materials such as iron and iron-cobalt alloys onto the substrate by well-known techniques such as sputtering, vacuum evaporation, plating, and electrodeposition.

Binder-free continuous magnetic recording layers are widely used in the art, since they can be simply produced and have excellent magnetic characteristics and high recording density. Of the various magnetic materials, ferrite oxide is particularly useful for the magnetic recording layer because of its hardness and resistance to corrosion.

Magnetic recording media with the above-described continuous magnetic layer, however, are disadvantageous when used in CSS system-based magnetic disc devices. In these magnetic disc devices, the magnetic head is generally picked up from and maintained over the surface of the magnetic layer during writing or recording and reading of information. At the start and stop of the rotation of the recording media, however, a slider of the magnetic head contacts and slips on the surface of the magnetic layer. Repeated contact and slippage of the slider with the magnetic layer results in wear on the surface in a head rounding zone of the magnetic recording media, spread of fine powders of the worn magnetic layer over the surface of the recording media, and consequently crushing of the magnetic head or briefly "head crush" and destruction of the stored information. It is therefore desirable to increase the resistance to wear of the magnetic recording media.

Many useful means and methods have been already proposed to prevent or decrease wear of the magnetic recording layer during operation of CSS system-based magnetic disc devices. One of them is the formation of a protective coating. For example, Japanese Unexamined Patent Publication (Kokai) No. 52-20804 discloses a magnetic recording medium having a protective coating of selected polysilicate. Other suitable protective coatings are those of synthetic resins or silicon dioxide. The formation of the protective coating is illustrated in FIG. 2. In FIG. 2, the layer constitution is identical with that of FIG. 1 except that a protective coating 4 is further coated as a top layer. This type of protective coating, however, cannot completely prevent wear of the underlying magnetic layer. The protective coating has a smooth surface due to the mirror surface of the alumite coating on the aluminum substrate. The smooth surface of the protective coating causes slippage of the magnetic head. This results wears down the coating and again which induces head crush.

As another means to decrease the wear of the magnetic recording layer, Japanese Unexamined Patent Publication (Kokai) No. 54-161909 suggests the use of a combination of a liquid lubricant such as perfluoroalkylpolyether and a solid lubricant such as telomer of tetrafluoroethylene on the magnetic recording layer. These lubricants may also be used on the protective coating, if desired. The lubricant coating formed on the magnetic layer or on the protective coating can smooth the slippage of the magnetic head for a short time, however, with time, the lubricant coating becomes thinner and decreases in lubricant action. As a result, the problems encountered in the previously described cases also occur. Further, an increase in the amount of the lubricant used would cause undesirable adhesion of the magnetic head to the surface of the magnetic recording layer. This adhesion of the head must be avoided, since it results in head crush or destruction of the supporting means for the magnetic head.

Japanese Unexamined Patent Publication (Kokai) No. 57-20925 teaches the formation of small cylindrical projections on the magnetic layer or the overlying protective coating. An example of a protective coating having small cylindrical projections can be found in FIG. 3A (cross-sectional view) and FIG. 3B (perspective view). From these figures, it will be understood that a plurality of cylindrical projections 5 having the same height are disposed on the protective coating 4. In FIG. 3A, 1 is an aluminum substrate, 2 is an alumite coating, and 3 is a magnetic recording layer. In this case, the lubricant is impregnated into the voids or gaps formed between the adjacent projections. This effectively eliminates the problems of adhesion of the magnetic head. However, with time, the centrifugal force during the rotation of the recording medium destroys the uniform distribution of the lubricant. Consequently, the lubricant coating at the outer portion of the recording medium becomes thicker. The lubricant frequently falls from the surface of the protective coating. It is, therefore, difficult to use the recording medium for a long period without the defects described above.

On the other hand, Japanese Unexamined Patent Publication (Kokai) No. 56-22221 teaches the formation of small cylindrical recesses on the protective coating of the magnetic recording medium. This is illustrated in FIGS. 4A and 4B, from which it is apparent that a plurality of recesses 6 having the same depth are randomly formed on the protective coating 4. The recesses 6 can effectively retain the lubricant, but they cannot prevent the decrease in the resistance to wear of the protective coating due to its smooth surface. In addition, the size of the recesses is on the order of 10 μm, since the recesses are produced through a masking process. In practice, recesses having a size on the order of 1 μm cannot be produced.

Recently, S. Otaki, one of the inventors of the present case, and four others achieved impregnation of a lubricant into a porous protective coating formed from thermoplastic resins (Cf. Japanese Unexamined Patent Publication (Kokai) No. 58-200431). The impregnated protective coating has excellent resistance to wear, but due to use of thermoplastic resins such as phenol, melamine, and epoxy in the formation of the porous protective coating, shows less CSS strength or mechanical strength.

SUMMARY OF THE INVENTION

According to this invention, there is provided a magnetic recording medium including a substrate having formed thereon, in sequence, a magnetic recording layer, a protective coating, and a lubricant coating, the protective coating including a plane portion which occupies a substantial area of the coating, and a plurality of fine projections and recesses formed on the plane portion.

In the magnetic recording medium according to this invention, the projections and/or recesses may be regularly or randomly distributed on the plane portion of the protective coating. Further, the size and configuration of the projections and/or recesses may be the same or different. Further, the projections and/or recesses may be partially or entirely stepped. The projections and recesses may be combined with each other in the form of craters having different sizes and configurations. The craters may be randomly distributed.

According to this invention, there is also provided a process for the production of the above magnetic recording medium including the steps of: (a) forming a magnetic recording layer on the substrate; (b) coating the magnetic recording layer with a protective coating-forming material; (c) selectively etching a layer of the protective coating-forming material; (d) further coating the etched layer of the protective coating-forming material with the same material; (e) forming a mask on the layer of the protective coating-forming material; (f) further coating the masked layer of the protective coating-forming material with the same material; (g) removing the mask and the protective coating-forming material overlaid thereon to obtain a protective coating; and (h) forming a lubricant coating on the resultant protective coating.

In the production process of this invention, the coating step (d) may be cancelled and, in place of this step, after the removal step (g) and before the coating step (h), the remaining layer of the protective coating-forming material may be further coated with the same material to obtain a protective coating. Alternatively, the selective etching step (c) may be repeated two or more times. Further, the coating step (b) and etching step (c) may be repeated two or more times.

According to this invention, there is also provided a process for the production of the magnetic recording medium with a plurality of fine craters having different sizes and configurations, including the steps of: (a) forming a magnetic recording layer on the substrate; (b) coating the magnetic recording layer with a solution of a first substance capable of thermally providing a protective coating-forming material and a second substance capable of forming droplets on the resulting coating, the droplets being thermally decomposed and evaporated; (c) baking the resulting coating having droplets of the second substance to form a protective coating having distributed thereon a plurality of craters; and (d) forming a lubricant coating on the resultant coating.

BRIEF DESCRIPTION OF THE DRAWINGS

FIG. 4A is a cross-sectional view of still another example of the prior art magnetic recording media;

FIG. 4B is a perspective view of the protective coating of FIG. 4A;

FIG. 5A is a cross-sectional view of a preferred embodiment of the magnetic recording medium according to this invention;

FIG. 5B is a perspective view of a surface configuration of the recording medium of FIG. 5A;

DESCRIPTION OF THE PREFERRED EMBODIMENTS

Figure 1:
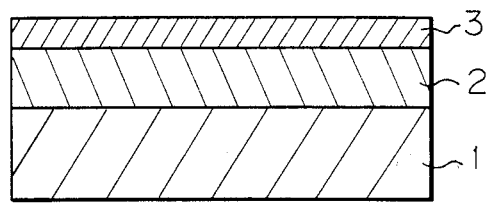
FIG. 1 is a cross-sectional view of an example of the prior art magnetic recording media.
Figure 2:
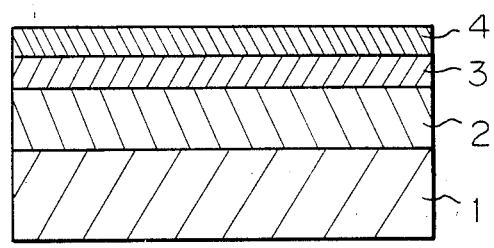
FIG. 2 is a cross-sectional view of another example of the prior art magnetic recording media.
Figure 3A:
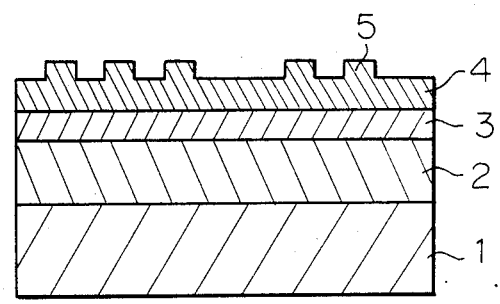
FIG. 3A is a cross-sectional view of still another example of the prior art magnetic recording media.
Figure 3B:
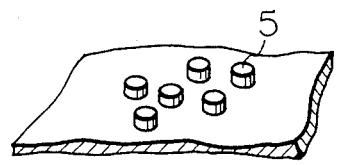
FIG. 3B is a perspective view of the protective coating of FIG. 3A.

FIG. 5A shows the magnetic recording medium according to a preferred embodiment of this invention. In the figure, reference numeral 1 indicates an aluminum substrate; 2 an alumite coating, which is a product of the surface oxidation of the aluminum substrate; 3 a magnetic recording layer, for example, $\gamma$-$Fe_2O_3$ coating produced through sputtering or other techniques; and 4 a protective coating, for example, a silicon dioxide coating. Of course, if desired, other light metals and their alloys may be used as the substrate in the practice of this invention.

The protective coating 4 has a plurality of fine craters 7. As is apparent from FIG. 5B, showing the surface configuration of the magnetic recording medium, the illustrated protective coating 4 includes a plane portion 10, ring-shaped projections 9 and a half sphere-shaped recesses 8. Each crater 7 is a combination of the recess 8 and the projection 9.

Figure 6A:
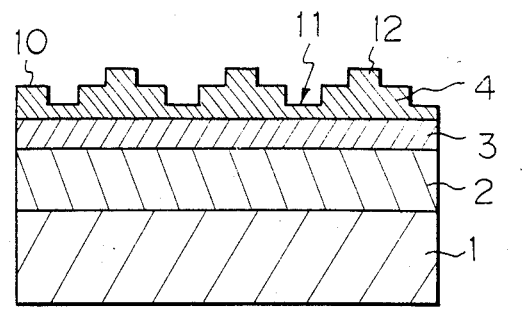
FIG. 6A is a cross-sectional view of another preferred embodiment of the magnetic recording medium according to this invention.
Figure 6B:
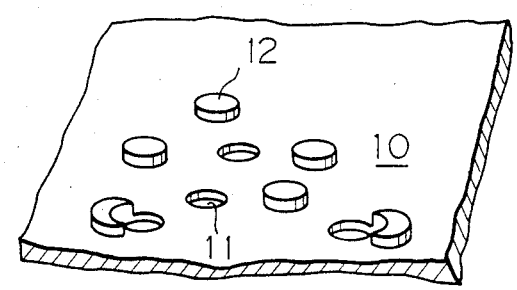
FIG. 6B is a perspective view of a surface configuration of the recording medium of FIG. 6A.

Another preferred embodiment of this invention can be found in FIGS. 6A and 6B. As in FIG. 5A, the illustrated recording medium comprises an aluminum substrate 1, an alumite coating 2, a $\gamma$-$Fe_2O_3$ layer 3, and a silicon dioxide protective coating 4. The protective coating 4 has a plane portion 10 having distributed thereon innumerable projections 12 and innumerable recesses 11. The projections 12 and the recesses 11 have the same size and configuration, respectively.

Figure 7A:
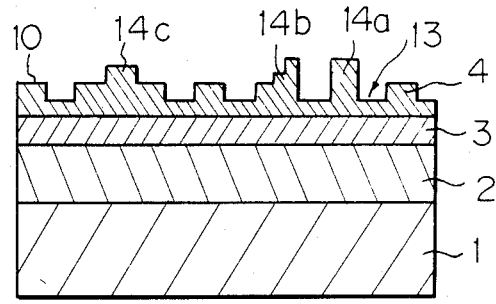
FIG. 7A is a cross-sectional view of still another preferred embodiment of the magnetic recording medium according to this invention.
Figure 7B:
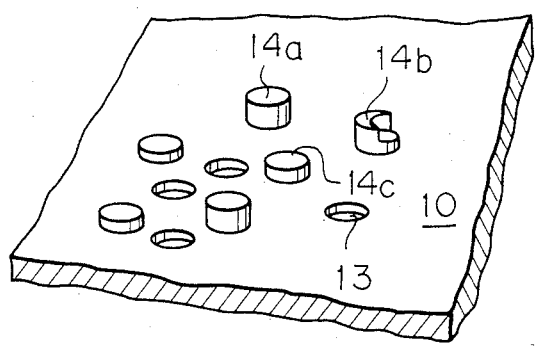
FIG. 7B is a perspective view of a surface configuration of the recording medium of FIG. 7A.

Still another preferred embodiment of this invention can be found in FIGS. 7A and 7B. The layer construction of the illustrated magnetic recording medium is identical with that of FIG. 6A except for the configuration of the protective coating. The protective coating 4 has recesses 13 having the same configuration and depth, while its projections have three different configurations and heights (14a, 14b, and 14c). The projection 14b has a stepped configuration. Of course, the recesses 13 may have different depths and may be stepped, if desired.

As described above, the protective coating of this invention consists of a plane portion which occupies a substantial area of the coating, innumerable fine projections protruding from the plane portion and innumerable fine recesses formed in the plane portion. Accordingly, when a lubricant is coated on the protective coating, it fills the recesses and is stably retained therein. As a result, the lubricating action of the coated lubricant is maintained and wear of the underlying protective coating is prevented for a long period. The minor amount of powder due to wear will be caught in the recesses and small gaps formed between the adjacent projections. This effectively avoids head crush. Further, since the slider of the magnetic head contacts only a top portion of each of the projections, close contact of the slider with the protective coating can be effectively avoided and the friction coefficient between them can be remarkably decreased.

Figure 8A:
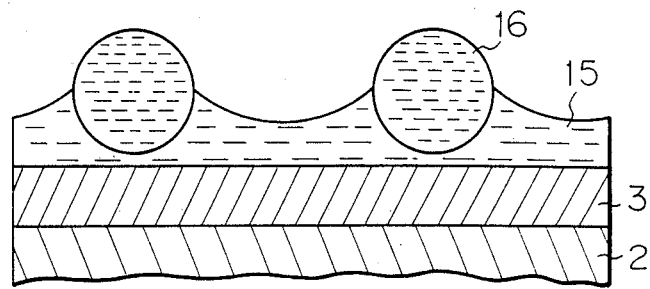
FIGS. 8A and 8B are cross-sectional views of the production steps of the recording medium of FIG. 5A.
Figure 8B:
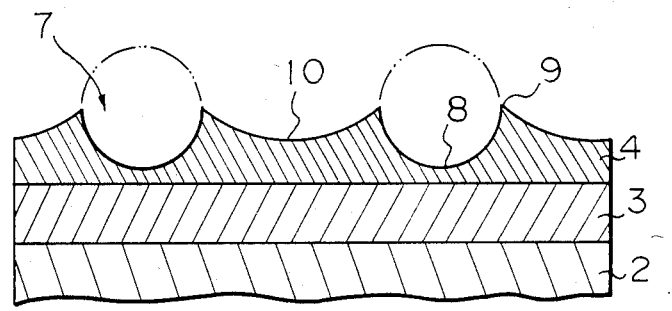

The magnetic recording media according to this invention can be produced as follows:

First, production of the magnetic recording medium with fine craters will be described with reference to FIGS. 8A and 8B. In FIGS. 8A and 8B, illustration of the aluminum substrate is omitted. After the formation of a $\gamma$-$Fe_2O_3$ magnetic layer 3 on the alumite coating 2, a mixed solution of a first substance capable of thermally providing a protective coating-forming material such as silicon dioxide, for example, Grass Resin ™ (Owens Illinois Co.), and a second substance capable of forming droplets on the resulting coating, the droplets being thermally decomposed and evaporated, for example, fluid paraffin, in a suitable solvent is spin coated on the magnetic layer 3. The coating step may be carried out after a silicon dioxide layer of a thickness of about 50 to 300 Å is deposited on the magnetic layer 3 in order to further improve the resistance to adhesion of the magnetic head. After spin coating, the resultant coating is baked at about 200° C. to 350° C. for about 1 to 5 hours. As a result of the evaporation of droplets of the fluid paraffin and the formation of silicon dioxide from Si(OH)$_4$ in the Grass Resin, a protective coating consisting essentially of silicon dioxide and having innumerable fine craters is formed on the magnetic layer 3.

FIG. 8A is a cross-sectional view of the protective coating-forming material after coating has been completed. As illustrated, droplets 16 of the fluid paraffin float in a sea 15 of the Grass Resin. These droplets do not combine to form large droplets due to their self-repellency. Then, after baking, as is illustrated in FIG. 8B, the fluid paraffin 16 is thermally decomposed and evaporated, while the Si(OH)$_4$, which is the main component of the Grass Resin, is thermally modified into silicon dioxide (layer 4). The solvents used for the preparation of the mixed solution to be coated will be substantially evaporated after coating, and the remainder will be completely evaporated during baking. The resulting silicon dioxide protective coating 4 having craters 10 (half-spherical recesses 8 plus ring-shaped projections 9) is shown in FIG. 8B. Reference number 10 refers to the plane portion of the protective coating.

In the preparation of the illustrated protective coating, any material can be used as the first substance insofar as it can provide a protective coating-forming material such as silicon dioxide after baking. Suitable materials include organic silicon compounds such as Grass Resin and other organic metal compounds such as butyllithium, tetraethyl lead, and bis (glyoxymat) nickel. In addition to the fluid paraffin, other materials can be used as the second substance, insofar as they can form droplets floating in the resulting coating and can be decomposed and evaporated during baking. Suitable materials include paraffin, vaseline, and naphthalene. These materials should be selected according to the properties of the first substance used therewith. Fluid paraffin is preferably used in an amount of about 0.1 to 2.0% by weight based on the total weight. Further, many solvents can be used in the preparation of the mixed solution. Typical examples of these solvents include ethylene glycol monoethyl ether acetate, xylene, ethyl acetate, methyl isobutyl ketone, diacetone alcohol, butanol, amyl alcohol, and cyclohexanol. These solvents may be used separately or in combination.

For further understanding of this invention, production of a magnetic recording medium having the cross-sectional view of FIG. 5A will be described in detail hereinafter:

Preparation of the Aluminum Substrate

The disc-shaped aluminum plate is planished with a diamond lathe. The mirror surface of the resulting aluminum substrate is further polished with a felt polishing pad to obtain a smooth surface having an Ra of 0.01 $\mu$m. After polishing, the aluminum substrate is dipped in a sulfuric acid bath to form thereon an alumite coating having a thickness of 3 $\mu$m. The alumite coating is also polished to make its surface smoother (Ra =0.006 $\mu$m). The polishing is effected with water by pressing on the rotating aluminum substrate an alumina tape under high load. After water polishing, the substrate is tape burnished and degreased with an alkali. Then, washing is effected, in sequence, with pure water and Freon ™ (E.I. du Pont Co.) vapor. After drying, the substrate is baked at 250° C. to 300° C. for one hour.

Formation of the Magnetic Layer

Sputtering is effected with an iron alloy target containing iron as its main component in an atmosphere of 100% oxygen and at a pressure of $1 \times 10^{-2}$ Torr to form a $\alpha$-$Fe_2O_3$ layer having a thickness of 0.2 $\mu$m on the alumite coating produced in the previous steps. Then, the α-Fe$_2$O$_3$ layer is subjected to reduction and oxidation processes to modify it to the corresponding γ-Fe$_2$O$_3$ layer. The reduction process can be carried out at 290° C. for two hours in an atmosphere of moisture-containing hydrogen and the oxidation process for three hours at a dry air atmosphere.

Formation of the Protective Coating

As a pretreatment, sputtering is effected with a silicon dioxide target in an atmosphere of 100% argon and at a gas pressure of $6.5 \times 10^{-3}$ Pa to form a silicon dioxide coating having a thickness of 50 to 120 Å on the alumite substrate. Then, the following Grass Resin-containing solution is spin coated at a speed of 1000 rpm. Composition of the coating solution:

| | |
|---|---|
| Grass Resin TM (Si(OH)$_4$-based silicon compounds having a Miranol structure, commercially available from Owens Illinois Co.) | 2% |
| Ethylene glycol monoethyl ether acetate | 50% |
| Xylene | 17% |
| Ethyl acetate | 31% |
| Fluid paraffin | 0.3% of the total weight |

The coated Grass Resin solution is then baked at 300° C. for one hour in an atmospheric environment. Innumerable craters are formed in the protective coating.

Coating of the Lubricant

Figure 13A:
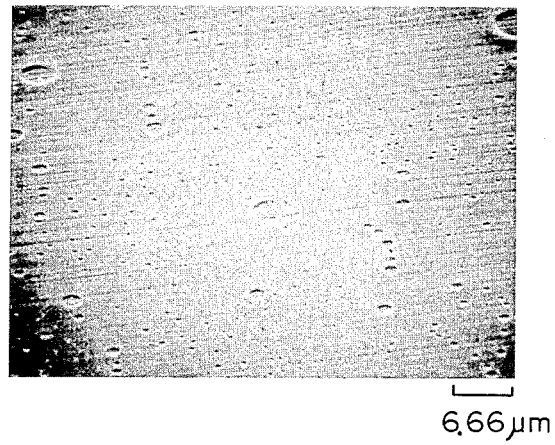
FIGS. 13A and 13B show the formation of craters on a silicon dioxide protective coating.
Figure 13B:
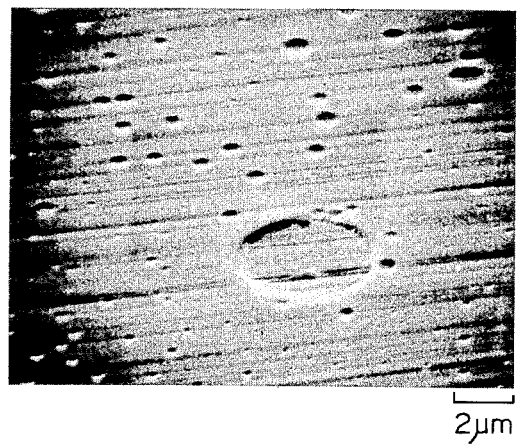

A 0.03% Florinate TM (fluorinated carbon solvent, commercially available from 3M Co.) solution of the lubricant Krytox 143AD TM (perfluoroalkyl polyether, commercially available from E.I. du Pont Co.) is coated on the silicon dioxide protective coating. The thus obtained magnetic recording medium is photographed with a scanning electron microscope. Electron micrographs FIG. 13A ($\times$1500) and FIG. 13B ($\times$5000) show the formation of the craters on the silicon dioxide protective coating.

The magnetic recording medium of this invention and two typical magnetic recording media according to the prior art are tested to ascertain the characteristics of the recording medium according to this invention. The results are summarized in the following table.

| | Invention | Prior art A[1] | Prior art B[2] |
|---|---|---|---|
| Static coefficient of friction | 0.08 to 0.15 | 0.20 to 0.80 | 0.32 to 0.50 |
| CSS strength[3] (revolutions) | >50,000 | 5,000 to 20,000 | 30,000 to 50,000 |
| Resistance to drag[4] (times) | >60 | <10 | 30 to 50 |
| Resistance to impact shock[5] (hours) | >150 | <5 | >100 |
| Pencil hardness[6] | 9H | 9H | 6H to 8H |
| Adhesion test[7] | Acceptable | Acceptable | Acceptable |

Notes:
Prior art A[1]The test sample comprises an aluminum substrate, a magnetic Co—Ni—P alloy layer, and a polysilicate protective coating.
Prior art B[2]The test sample comprises an aluminum substrate having spin coated thereon γ-Fe$_2$O$_3$ containing binders.
CSS strength[3]CSS operation of the magnetic head is repeated to ascertain the durability of the test samples.
Resistance to drag[4]The magnetic head with edges is repeatedly dragged on the test sample to determine the resistance.
Resistance to impact shock[5]The positioner of DE is repeatedly impacted to determine the impact strength.
Pencil hardness[6]The surface of the test sample is scratched with the tips of pencils having different hardnesses. Check the peeling.
Adhesion test[7]Check the change of the static coefficient of friction after 24 hours.

From these results, it is apparent that the magnetic recording media according to this invention have excellent CSS strength as well as sufficient resistance to drag, impact shock, and scratching and do not cause adhesion of the magnetic head to the magnetic layer. Surprisingly, according to this invention, one of the useful lubricants, fluorinated oil such as Krytox TM, can be effectively coated on the protective coating, in contrast to the prior art continuous magnetic layers to which the fluorinated oil is not applicable.

Another preferred process for the production of the magnetic recording medium according to this invention will be described with reference to FIGS. 9(1) through 9(11):

1. Sputtering of silicon dioxide (FIG. 9(1))

After the formation of an alumite coating 2 and a magnetic γ-Fe$_2$O$_3$ layer 3 on the aluminum substrate (not shown), silicon dioxide is deposited on the magnetic layer 3 by means of sputtering or other techniques. Thus, the silicon dioxide layer 4 is formed. Silicon dioxide is particularly advantageous due to its resistance to wear.

2. Formation of the mask (FIG. 9(2))

A coating solution of one can-type polyurethane rubber is coated on the silicon dioxide layer 4. The coating of polyurethane rubber is then treated with a solution of Freon TM (fluorohydrocarbons, commercially available from E.I. du Pont Co.) containing surfactants to change the shape of the rubber. Subsequent baking provides masks 17 of the polyurethane rubber.

3. Etching (FIG. 9(3))

The silicon dioxide layer 4 is dry etched with an etchant such as carbon tetrafluoride (CF$_4$) gas through the previously produced masks 17. The exposed area of the silicon dioxide layer 4 is therefore removed.

4. Removal of the masks (FIG. 9(4))

After selective etching in step (3), the used masks 9 are removed by wiping out them with a solvent such as methyl ethyl ketone. As illustrated in FIG. 9(4), silicon dioxide projections 4 remain on the magnetic layer 3.

5. Sputtering of silicon dioxide (FIG. 9(5))

A new silicon dioxide layer 18 is deposited on the silicon dioxide projections 4 in a manner similar to that of step (1). The thickness of this silicon dioxide layer 18 is preferably about 50 Å.

6. Formation of the mask (FIG. 9(6))

The operation of step (2) is repeated to form masks 19 on the combined silicon dioxide layer 4'.

7. Removal of the thin layer of the polyurethane rubber (FIG. 9(7))

In the previous step (6), the thin layer of the polyurethane rubber, which would adversely affect the adhesion of a new silicon dioxide layer to the previously formed silicon dioxide layer 4' in the subsequent step, is formed around the masks 19. This layer of the polyurethane rubber is removed with dry etching.

8. Sputtering of silicon dioxide (FIG. 9(8))

The operation of step (1) is repeated to form a new silicon dioxide layer 20. The silicon dioxide layer 20 comprises four portions 20a, 20b, 20c, and 20d.

9. Removal of the mask (FIG. 9(9))

The masks 19 formed in step (6) are forcibly wiped off with a suitable wiping solvent such as methyl ethyl ketone. The overlying silicon dioxide layers 20b and 20d are also removed.

10. Cleaning (FIG. 9(10))

In order to remove the remaining masks and other undesirable portions, the surface of the combined silicon dioxide layer or protective coating 4" is cleaned with a suitable solvent such as methyl ethyl ketone. As illustrated in FIG. 9(10), the silicon dioxide protective coating 4" has a plane portion 10, recesses 21a and 21b having different depths, and projections 22.

11. Coating of the lubricant (FIG. 9(11))

A lubricant such as Krytox TM is coated on the silicon dioxide protective coating 4" to form a thin lubricant coating 23. The lubricant is impregnated into the recesses 21a and 21b and the gaps between the adjacent projections 22. It will be stably retained during the operation of the recording medium. Further, it will be understood that the lubricant on the protective coating is gradually fed to contact portions of the slider of the magnetic head with the magnetic recording medium. This is very effective for solving the problems of adhesion of the magnetic head and increasing the coefficient of friction and CSS strength.

In this production process, the sputtering step (5) may be cancelled, if the same sputtering operation can be repeated after the cleaning step (10) and before the coating step (11).

The surface configuration of the resulting magnetic medium will vary depending upon the thickness $x_1$ of the silicon dioxide layer 4 of step (1) and the thickness $x_2$ of the silicon dioxide layer 20 of step (8). Namely, (i) In the case of $x_1 = x_2$, the projections and recesses each have the same height and depth, as illustrated in FIGS. 6A and 6B.

(ii) In the cases of $x_1 > x_2$ and $x_1 ° 1 x_2$, the projections will have different heights, as in FIGS. 7A and 7B. Further, if $x_1$ is thicker than $x_2$, shallower recesses and higher projections will be formed and, depending upon the masking process, the projections will be stepped. In contrast, if $x_1$ is thinner than $x_2$, deeper recesses and lower projections will result.

Figure 10A:
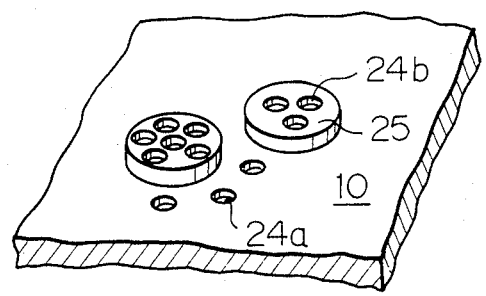
FIGS. 10A and 10B are perspective views of a surface configuration of the magnetic recording media according to preferred embodiments of this invention.
Figure 10B:
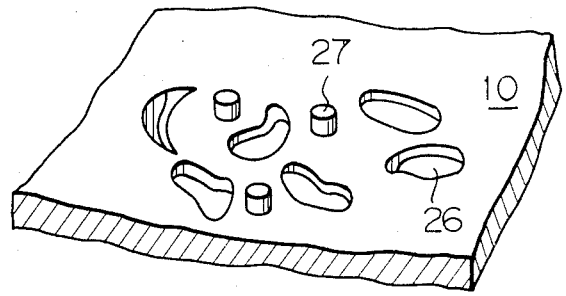

According to the process of this invention, fine masks having a size on the submicron order (0.3 to several micrometers) can be easily produced by utilizing the surface tension of certain mask-forming materials such as one can-type polyurethane rubber (monosan TM, commercially available from Indopole Co.). Further, by combining this masking process with etching and lift-off techniques, innumerable fine projections can be produced with ease. Furthermore, the size and configuration of the projections and recesses can be controlled depending upon the desired results. Distribution of the projections and recesses can also be controlled. For this control of the projections and recesses, it is contemplated to suitably select the concentration of the mask-forming materials, conditions of the spin coating, conditions of the etching, and the like. For example, stepped projections and recesses will be produced as a result of change of the etching time. FIGS. 10A and 10B show modifications of the surface configuration of the magnetic recording medium according to this invention.

Figure 11:
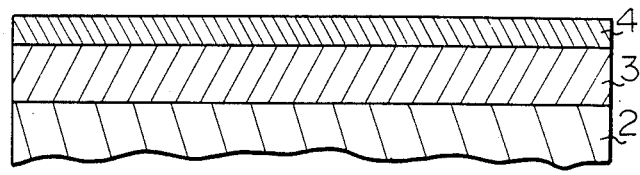
FIGS. 11(1) through 11(18) are cross-sectional views of the production steps of the magnetic recording medium according to another preferred embodiment of this invention.
Figure 11:
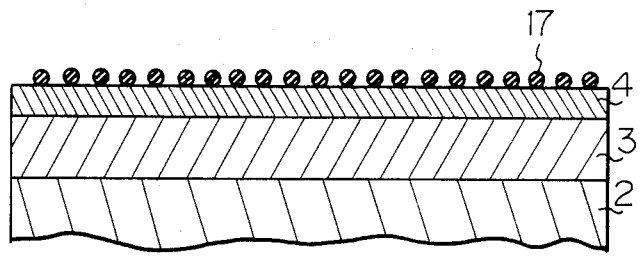
Figure 11:
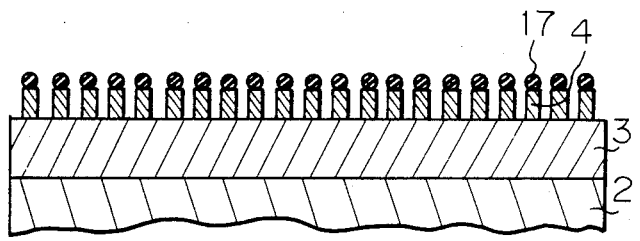
Figure 11:
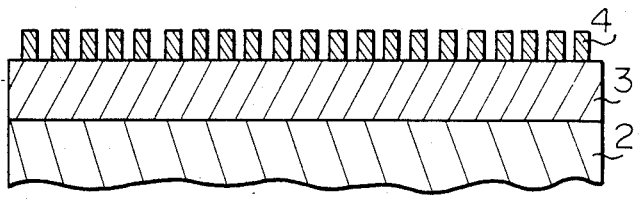
Figure 11:
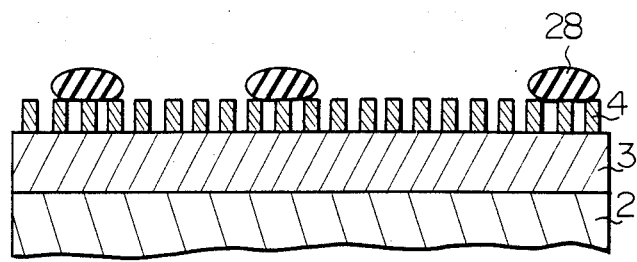
Figure 11:
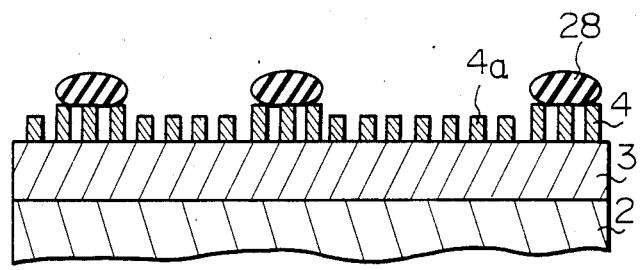
Figure 11:
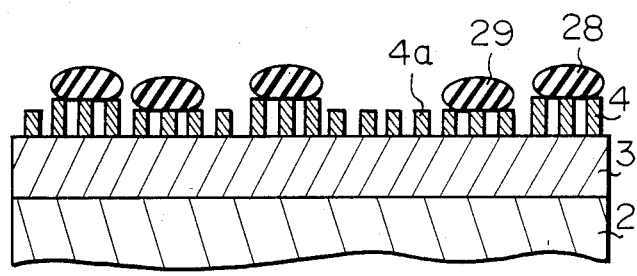
Figure 11:
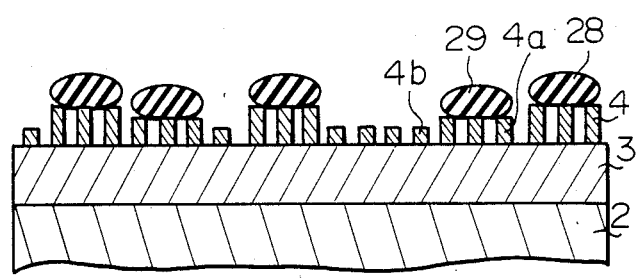
Figure 11:
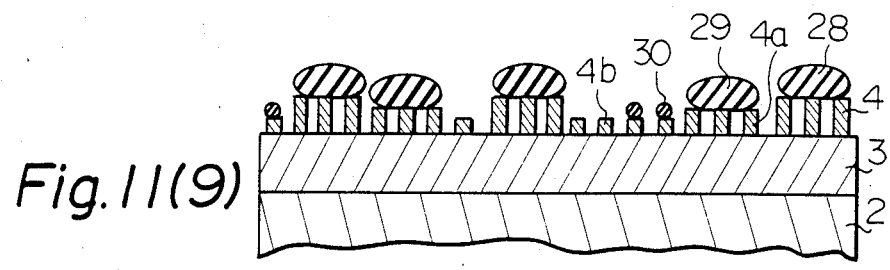
Figure 11:
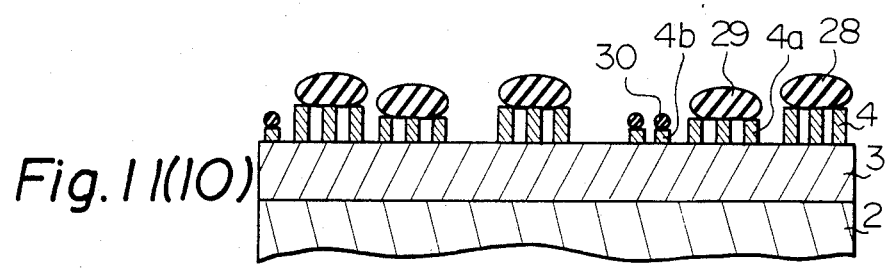
Figure 11:
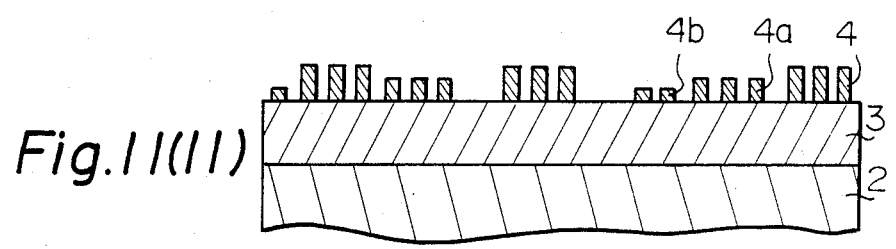
Figure 11:
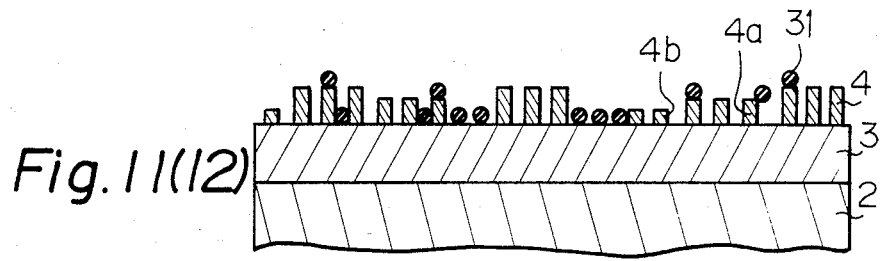
Figure 11:
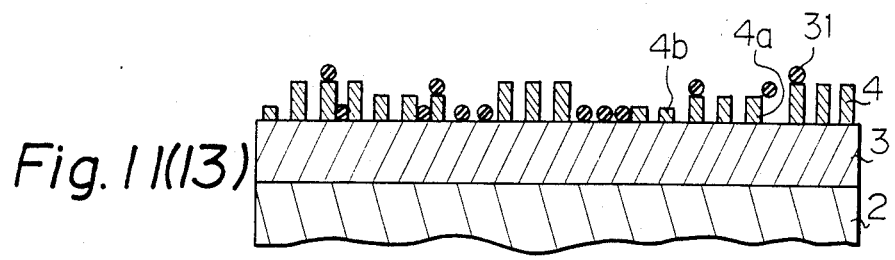
Figure 11:
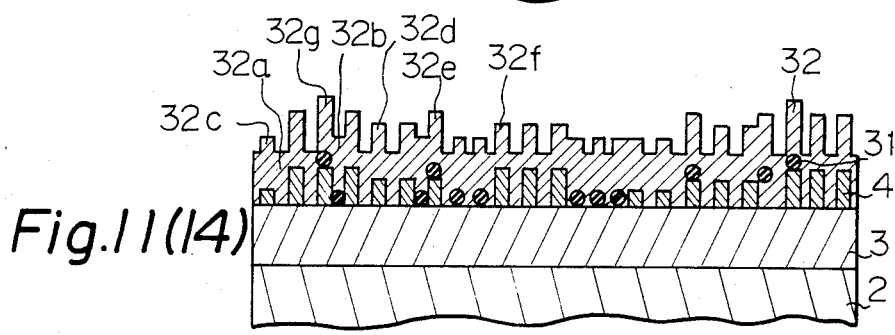
Figure 11:
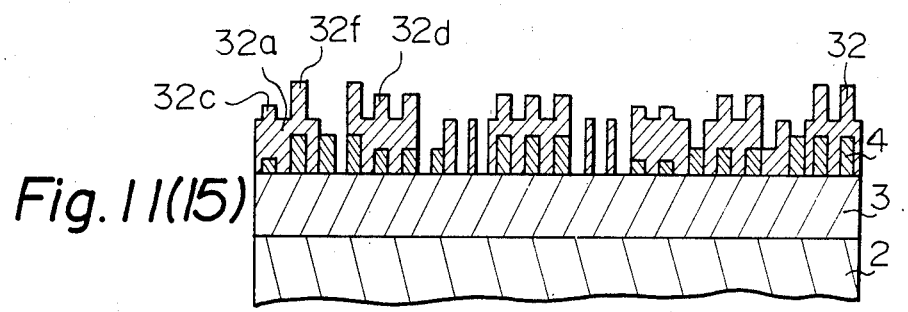
Figure 11:
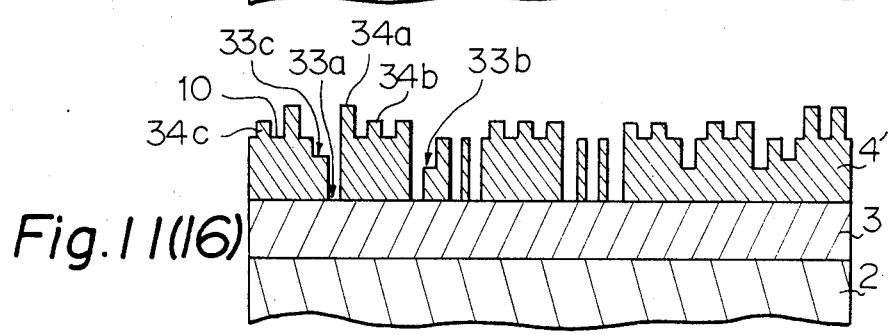
Figure 11:
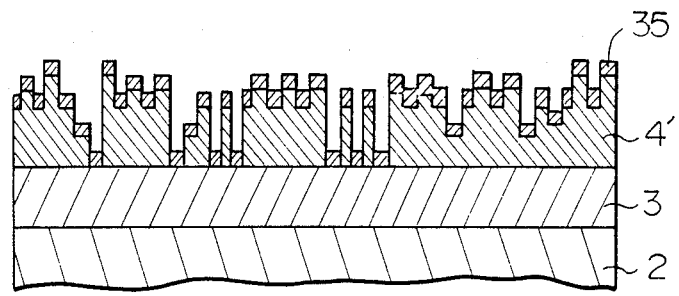
Figure 11:
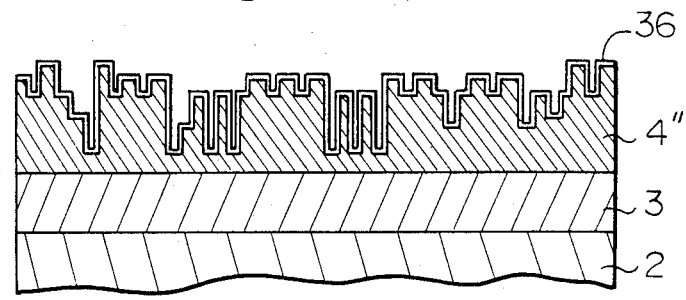

Still another preferred process for the production of the magnetic recording medium according to this invention will be described with reference to FIGS. 11(1) through 11(18):

1. Sputtering of silicon oxide (FIG. 11(1))

Figure 9:
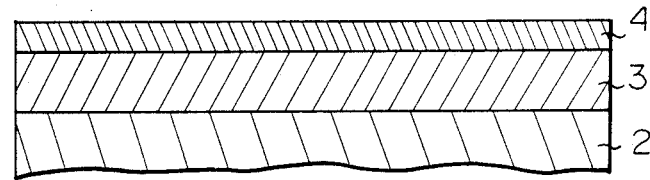
FIGS. 9(1) through 9(11) are cross-sectional views of the production steps of the magnetic recording medium according to a preferred embodiment of this invention.
Figure 9:
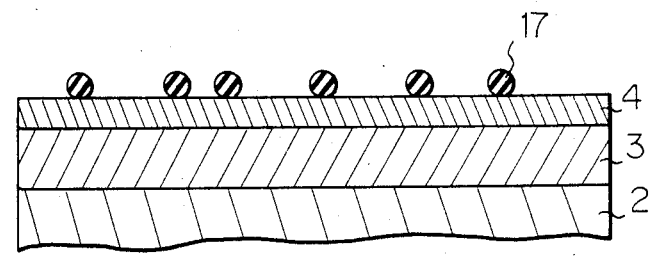
Figure 9:
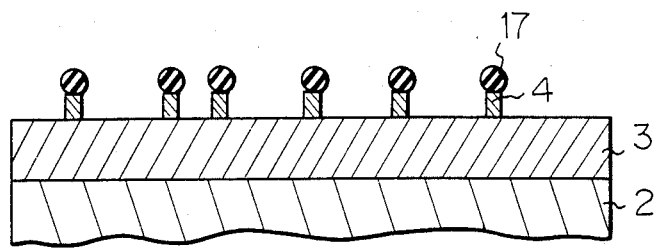
Figure 9:
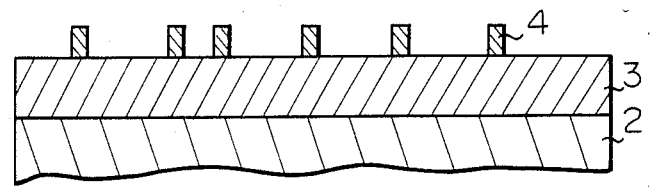
Figure 9:
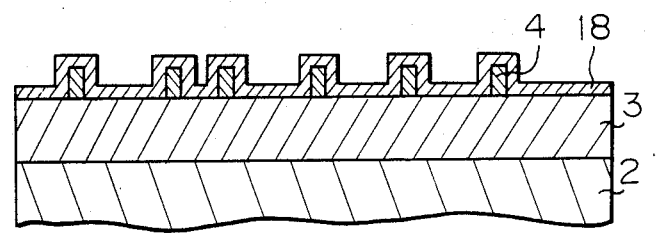
Figure 9:
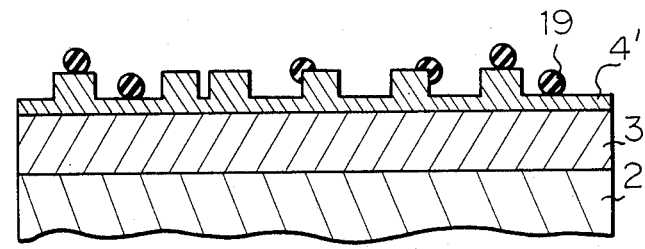
Figure 9:
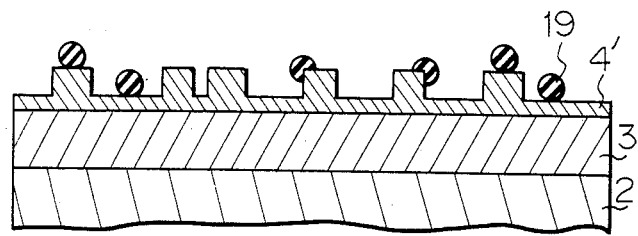
Figure 9:
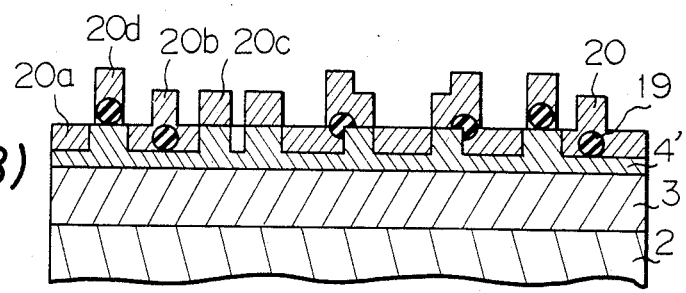
Figure 9:
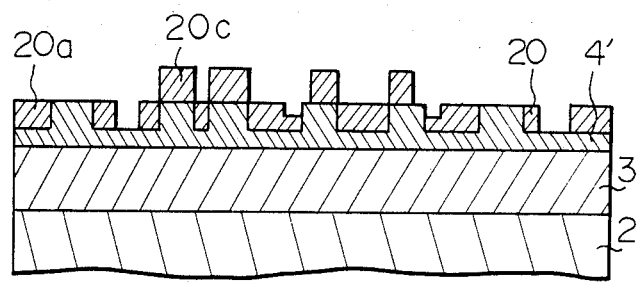
Figure 9:
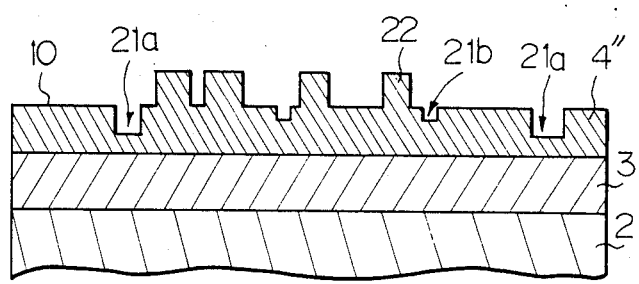
Figure 9:
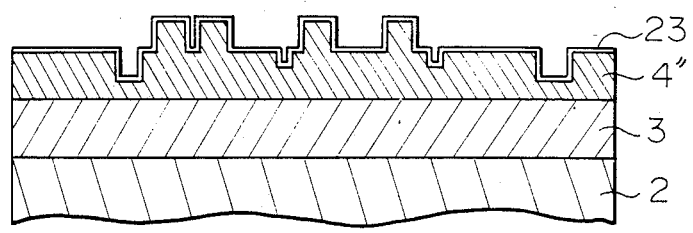

Substantially identical with those of FIG. 9(1) except for an increased number of silicon dioxide projections 4.

2. Formation of the mask (FIG. 11(2))

Substantially identical with those of FIG. 9(2) except for an increased number of silicon dioxide projections 4.

3. Etching (FIG. 11(3))

Substantially identical with those of FIG. 9(3) except for an increased number of silicon dioxide projections 4.

4. Removal of the masks (FIG. 11(4))

Substantially identical with those of FIG. 9(4) except for an increased number of silicon dioxide projections 4.

5. Formation of the mask (FIG. 11(5))

The operation of step (2) is repeated to form second rubber masks 28.

6. Etching (FIG. 11(6))

The operation of step (3) is repeated except that the etching time was shortened to one-third of that of step (3). Slightly etched silicon dioxide projections 4a are formed.

7. Formation of the mask (FIG. 11(7))

The operation of step (2) is again repeated to form third rubber masks 29.

8. Etching (FIG. 11(8))

The operation of step (3) is again repeated to obtain etched silicon dioxide projections 4b. The etching time is one-third of that of step (3).

9. Formation of the mask (FIG. 11(9))

The operation of step (2) is again repeated to form fourth rubber masks 30.

10. Etching (FIG. 11(10))

The operation of step (3) is again repeated. As illustrated in FIG. 11(10), the exposed silicon dioxide projections 4b are completely removed.

11. Removal of the masks (FIG. 11(11))

After the completion of etching, the used masks 28, 29, and 30 are removed by wiping with a solvent such as methyl ethyl ketone. Silicon dioxide projections 4, 4a, and 4b remain.

12. Formation of the mask (FIG. 11(12))

The operation of step (2) is again repeated to form masks 31 in a desired pattern.

13. Removal of the thin layer of the polyurethane rubber (FIG. 11(13))

A thin layer of the polyurethane rubber formed around the masks 31 is removed with dry etching, since it adversely affects the adhesion of a new silicon dioxide layer to the underlying portion in the subsequent step.

14. Sputtering of silicon dioxide (FIG. 11(14))

The operation of step (1) is repeated to form a new silicon dioxide layer 32. The silicon dioxide layer 32 comprises seven portions 32a, 32b, 32c, 32d, 32e, 32f, and 32g.

15. Removal of the mask (FIG. 11(15))

The masks 31 are forcibly wiped off with a suitable solvent, for example, methyl ethyl ketone. In addition to these masks 31, the overlying silicon dioxide layers 32b, 32e, and 32g are also removed.

16. Cleaning (FIG. 11(16))

A surface of the combined silicon dioxide layer 4' is cleaned with a suitable solvent such as methyl ethyl ketone. As is shown, the silicon dioxide layer 4' has a plane portion 10, recesses 33a 33b and 33c having different depths, and projections 34a, 34b, and 34c having different heights.

17. Sputtering of silicon dioxide (FIG. 11(17))

An additional silicon dioxide layer 35 is formed on the cleaned silicon dioxide layer 4' in a manner similar to that of step (1).

18. Coating of the lubricant (FIG. 11(18))

A lubricant such as Krytox TM is coated on the resulting silicon dioxide protective coating 4" to form a thin lubricant coating 36. The lubricant is stably retained in the recesses 33a, 33b, and 33c, and the gaps formed between the adjacent projections 34a, 34b, and 34c.

Figure 12:
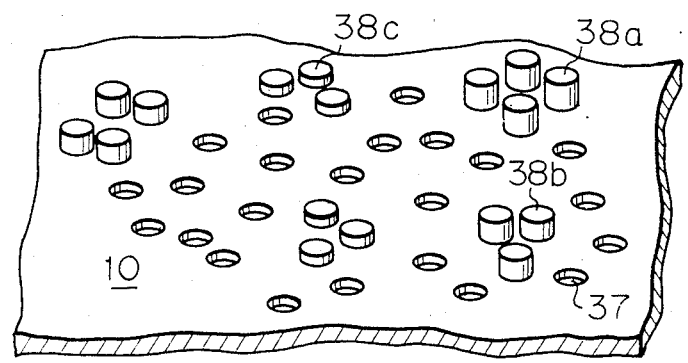
FIG. 12 is a perspective view of a surface configuration of the recording medium produced through the steps of FIGS. 11(1) through 11(18)

The surface configuration of the resulting protective coating is illustrated in FIG. 12. Projections 38a, 38b, and 38c have the heights 300 Å, 200 Å, and 100 Å, respectively. The depth of the recesses 37 is 500 Å. Each projection and recess has a diameter of about 2 to 3 μm.

We claim:

1. A magnetic recording medium comprising a substrate having formed thereon, in sequence, a magnetic recording layer, a protective coating, and a lubricant coating, said protective coating being one material and comprising a plane portion which occupies a substantial area of the coating, and a plurality of fine projections and recesses formed on said plane portion.

2. A magnetic recording medium as in claim 1, in which said projections and/or recesses are regularly distributed on said plane portion.

3. A magnetic recording medium as in claim 1, in which said projections and/or recesses are randomly distributed on said plane portion.

4. A magnetic recording medium as in any of claims 1 through 3, in which said projections and/or recesses have the same size and configuration.

5. A magnetic recording medium as in any of claims 1 through 3, in which said projections and/or recesses have different sizes and configuration.

6. A magnetic recording medium as in claim 1, in which said projections and/or recesses are partially or entirely stepped.

7. A magnetic recording medium as in claim 1, in which said projections and recesses are combined with each other and are in the form of craters having different sizes and configurations.

8. A magnetic recording medium as in claim 7, in which said craters are randomly distributed on said plane portion.

9. A magnetic recording medium as in claim 1, wherein said projections are friction-reducing projections and said recesses are lubricant-retaining recesses.

10. A magnetic recording medium comprising a substrate having formed thereon, in sequence, a magnetic recording layer, a protective coating means for reducing friction and retaining lubricant, and a lubricant coating, said protective coating means being made of one material and comprising a plane portion which occupies a substantial area of the coating, and a plurality of fine friction-reducing productions and lubricant-retaining recesses formed on said plane portion.

* * * * *